(12) United States Patent
Boyd et al.

(10) Patent No.: US 7,734,772 B2
(45) Date of Patent: *Jun. 8, 2010

(54) SYSTEM AND METHOD FOR ANALYZING REMOTE TRAFFIC DATA IN A DISTRIBUTED COMPUTING ENVIRONMENT

(75) Inventors: William Glen Boyd, Portland, OR (US); Elijahu Shapira, Portland, OR (US)

(73) Assignee: Webtrends, Inc., Portland, OR (US)

( * ) Notice: Subject to any disclaimer, the term of this patent is extended or adjusted under 35 U.S.C. 154(b) by 398 days.

This patent is subject to a terminal disclaimer.

(21) Appl. No.: 11/682,150

(22) Filed: Mar. 5, 2007

(65) Prior Publication Data

US 2007/0198707 A1    Aug. 23, 2007

Related U.S. Application Data

(63) Continuation of application No. 10/688,309, filed on Oct. 17, 2003, now Pat. No. 7,206,838, which is a continuation of application No. 10/046,976, filed on Jan. 11, 2002, now Pat. No. 6,662,227, which is a continuation of application No. 09/425,280, filed on Oct. 21, 1999, now Pat. No. 6,360,261, which is a continuation of application No. 08/801,707, filed on Feb. 14, 1997, now Pat. No. 6,112,238.

(51) Int. Cl.
*G06F 11/30* (2006.01)
(52) U.S. Cl. ........................ 709/224; 709/218
(58) Field of Classification Search .................. 709/224, 709/223, 203, 218; 710/1, 10, 100
See application file for complete search history.

(56) References Cited

U.S. PATENT DOCUMENTS 5,539,659 A    7/1996   McKee et al.
(Continued)

FOREIGN PATENT DOCUMENTS

EP            0618533 A2    6/1994

OTHER PUBLICATIONS

Catledge, et al; "Characterizing Browsing Strategies in the World-Wide Web"; *Computer Networks and ISDN Systems* 27 (1995) pp. 1065-1073.

(Continued)

*Primary Examiner*—Kenneth R Coulter
(74) *Attorney, Agent, or Firm*—Marger Johnson & McCollom, P.C.

(57) ABSTRACT

A system, method and storage medium embodying computer-readable code for analyzing traffic data in a distributed computing environment are described. The distributed computing environment includes a plurality of interconnected systems operatively coupled to a server, a source of traffic data hits and one or more results tables categorized by an associated data type. Each results table includes a plurality of records. The server is configured to exchange data packets with each interconnected system. Each traffic data hit corresponds to a data packet exchanged between the server and one such interconnected system. Each traffic data hit is collected from the traffic data hits source as access information into one such record in at least one results table according to the data type associated with the one such results table. Each of the records in the results table corresponds to a different type of access information for the data type associated with the results table. The access information collected into the results tables during a time slice is summarized periodically into analysis results. The time slice corresponds to a discrete reporting period. The access information is analyzed from the results tables in the analysis results to form analysis summaries according to the data types associated with the results tables.

18 Claims, 12 Drawing Sheets

U.S. PATENT DOCUMENTS

| | | | |
|---|---|---|---|
| 5,649,107 | A | 7/1997 | Kim et al. |
| 5,675,510 | A | 10/1997 | Coffey et al. |
| 5,689,416 | A | 11/1997 | Shimizu et al. |
| 5,727,129 | A | 3/1998 | Barrett et al. |
| 5,732,218 | A | 3/1998 | Bland et al. |
| 5,748,881 | A | 5/1998 | Lewis et al. |
| 5,778,350 | A | 7/1998 | Adams et al. |
| 5,796,952 | A | 8/1998 | Davis et al. |
| 5,878,223 | A | 3/1999 | Becker et al. |
| 5,974,457 | A | 10/1999 | Waclawsky et al. |
| 6,112,238 | A | 8/2000 | Boyd et al. |
| 6,317,787 | B1 | 11/2001 | Boyd et al. |
| 6,360,261 | B1 | 3/2002 | Boyd et al. |
| 6,449,618 | B1 | 9/2002 | Blott et al. |
| 6,662,227 | B2 * | 12/2003 | Boyd et al. .................. 709/224 |
| 7,206,838 | B2 | 4/2007 | Boyd et al. |

OTHER PUBLICATIONS

Cooley, et al.; "Grouping Web Page References into Transactions for Mining World Wide Web Browsing Patterns"; *IEEE Computer Society Knowledge and Data Engineering Exchange Workshop*; (1997) pp. 2-9.

*WebTrends Installation and User Guide*; (1996) pp. A-D; 1-62.

Tak, et al. "From User Access Patterns to Dynamic Hypertext Linking"; *Computer Networks and ISDN Systems* 28 (1996) pp. 1007-1014.

WebTrends™ Essential Reporting for your Web Server, Installation and User Guide, Jan. 1996 Edition, by e.g. Software, Inc., 62 page manual.

* cited by examiner

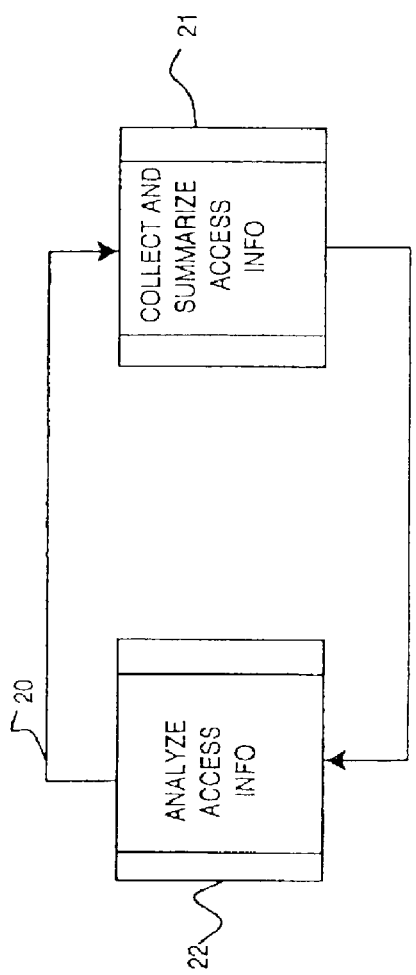

though the web servers interconnected via the Internet provide access to a potentially worldwide audience with a minimal investment in time and resources in building a web site. -->

SYSTEM AND METHOD FOR ANALYZING REMOTE TRAFFIC DATA IN A DISTRIBUTED COMPUTING ENVIRONMENT

CROSS-REFERENCE TO RELATED PATENT APPLICATIONS

This application is a continuation of U.S. patent application Ser. No. 10/688,309, filed Oct. 17, 2003 (issued as U.S. Pat. No. 7,206,838 on Apr. 17, 2007), which is a continuation of U.S. patent application Ser. No. 10/046,976, filed Jan. 11, 2002 (issued as U.S. Pat. No. 6,662,227 on Dec. 9, 2003), which is a continuation of U.S. patent application Ser. No. 09/425,280, filed Oct. 21, 1999 (issued as U.S. Pat. No. 6,360,261 on Mar. 19, 2002), which is a continuation of U.S. patent application Ser. No. 08/801,707, filed Feb. 14, 1997 (issued as U.S. Pat. No. 6,112,238 on Aug. 29, 2000).

BACKGROUND OF THE INVENTION

This invention relates generally to remote traffic data analysis and more particularly to a system and method for analyzing remote traffic data in a distributed computing environment.

The worldwide web (hereinafter "web") is rapidly becoming one of the most important publishing mediums today. The reason is simple: web servers interconnected via the Internet provide access to a potentially worldwide audience with a minimal investment in time and resources in building a web site. The web server makes available for retrieval and posting a wide range of media in a variety of formats, including audio, video and traditional text and graphics. And the ease of creating a web site makes reaching this worldwide audience a reality for all types of users, from corporations, to startup companies, to organizations and individuals.

Unlike other forms of media, a web site is interactive and the web server can passively gather access information about each user by observing and logging the traffic data packets exchanged between the web server and the user. Important facts about the users can be determined directly or inferentially by analyzing the traffic data and the context of the "hit." Moreover, traffic data collected over a period of time can yield statistical information, such as the number of users visiting the site each day, what countries, states or cities the users connect from, and the most active day or hour of the week. Such statistical information is useful in tailoring marketing or managerial strategies to better match the apparent needs of the audience.

To optimize use of this statistical information, web server traffic analysis must be timely. However, it is not unusual for a web server to process thousands of users daily. The resulting access information recorded by the web server amounts to megabytes of traffic data. Some web servers generate gigabytes of daily traffic data. Analyzing the traffic data for even a single day to identify trends or generate statistics is computationally intensive and time-consuming. Moreover, the processing time needed to analyze the traffic data for several days, weeks or months increases linearly as the time frame of interest increases.

The problem of performing efficient and timely traffic analysis is not unique to web servers. Rather, traffic data analysis is possible whenever traffic data is observable and can be recorded in a uniform manner, such as in a distributed database, client-server system or other remote access environment.

One prior art web server traffic analysis tool is described in "WebTrends Installation and User Guide," version 2.2, October 1996, the disclosure of which is incorporated herein by reference. WebTrends is a trademark of e.g. Software, Portland, Oreg. However, this prior art analysis tool cannot perform ad hoc queries using a log-based archival of analysis summaries for efficient performance.

Other prior art web server traffic analysis tools are generally effective in handling modest volumes of server traffic data when operating on a small scale server or non-mainframe solution. Examples of these analysis tools include Market Focus licensed by Intersè Corporation, Hit List licensed by MarketWave and Net.Analysis licensed by Net.Genisys. However, these analysis tools require increasingly expensive and complex hardware systems to handle higher traffic data volumes. The latter approach is impracticable for the majority of web server operators. Moreover, these prior art analysis tools are also incapable of rapidly generating trend and statistical information on an ad hoc basis Therefore, there is a need for a system and method to efficiently process the voluminous amounts of access information generated by web servers in a timely, expedient manner without the attendant costs associated with large scale hardware requirements. Preferably, such a system and method could perform ad hoc queries of analysis summaries in a timely and accurate manner.

There is a further need for a system and method for efficiently analyzing traffic data reflecting access information on a web server operating in a distributed computing environment. Preferably, such a system and method would process traffic data presented from a variety of sources.

There is still a further need for a system and method for analyzing traffic data consisting of access information for predefined time slices.

SUMMARY OF THE INVENTION

The present invention comprises a system and method for analyzing remote traffic data in a distributed computing environment in a timely and accurate manner.

An embodiment of the present invention is a system, method and storage medium embodying computer-readable code for analyzing traffic data in a distributed computing environment. The distributed computing environment includes a plurality of interconnected systems operatively coupled to a server, a source of traffic data hits and one or more results tables categorized by an associated data type. Each results table includes a plurality of records. The server is configured to exchange data packets with each interconnected system. Each traffic data hit corresponds to a data packet exchanged between the server and one such interconnected system. Each traffic data hit is collected from the traffic data hits source as access information into one such record in at least one results table according to the data type associated with the one such results table. Each of the records in the results table corresponds to a different type of access information for the data type associated with the results table. The access information collected into the results tables during a time slice is summarized periodically into analysis results. The time slice corresponds to a discrete reporting period. The access information is analyzed from the results tables in the analysis results to form analysis summaries according to the data types associated with the results tables.

The foregoing and other features and advantages of the invention will become more readily apparent from the following detailed description of a preferred embodiment of the invention which proceeds with reference to the accompanying drawings.

BRIEF DESCRIPTION OF THE DRAWINGS

FIG. 2 is a flow diagram of a method for analyzing traffic data in a distributed computing environment according to the present invention using the system of FIG. 1.

FIG. 3A shows a format used in storing a "hit" of traffic data received by the server of FIG. 1.

DETAILED DESCRIPTION

Figure 1:
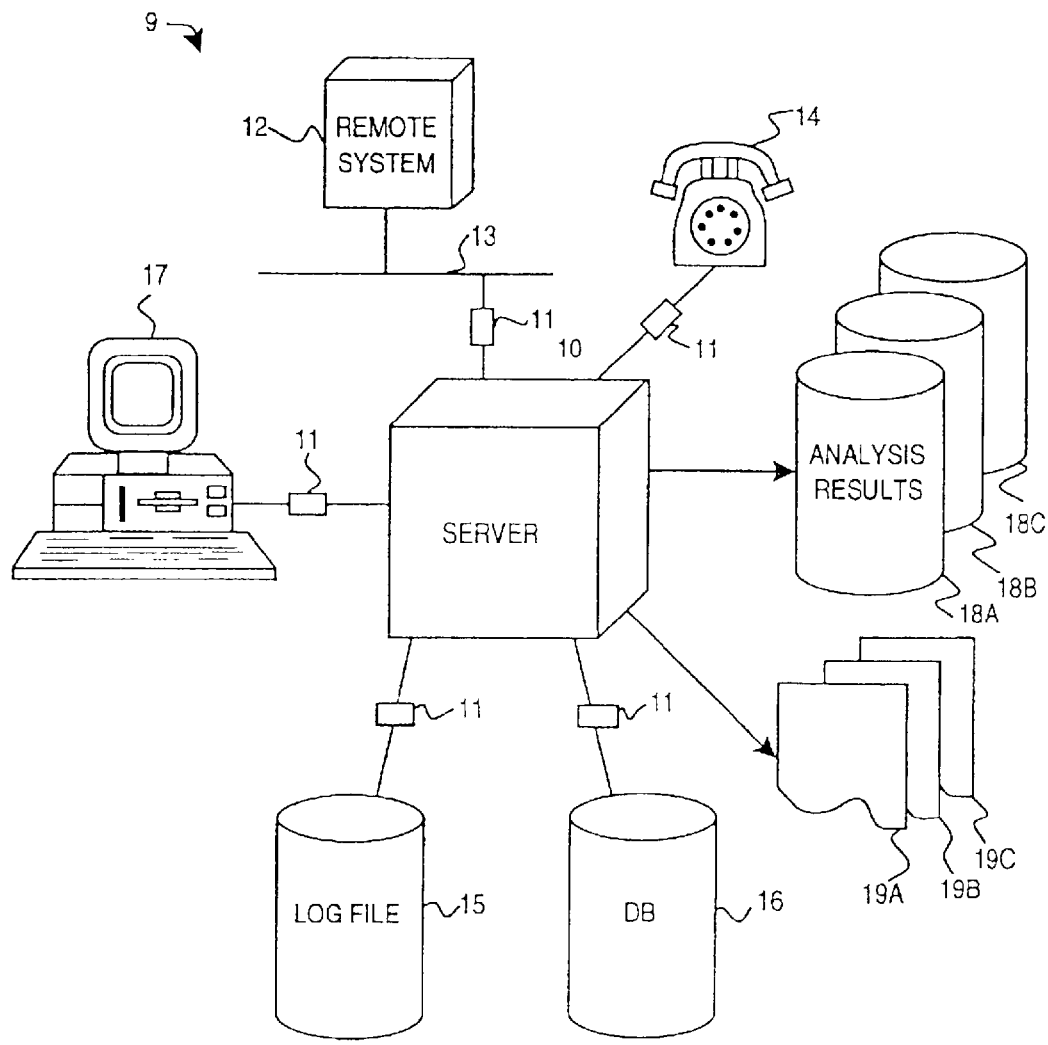
FIG. 1 is a functional block diagram of a system for analyzing traffic data in a distributed computing environment according to the present invention.

FIG. 1 is a functional block diagram of a system for analyzing traffic data in a distributed computing environment 9 according to the present invention. A server 10 provides web site and related services to remote users. By way of example, the remote users can access the server 10 from a remote computer system 12 interconnected with the server 10 over a network connection 13, such as the Internet or an intranetwork, a dial up (or point-to-point) connection 14 or a direct (dedicated) connection 17. Other types of remote access connections are also possible.

Each access by a remote user to the server 10 results in a "hit" of raw traffic data 11. The format used in storing each traffic data hit 11 and an example of a traffic data hit 11 are described below with reference to FIGS. 3A and 3B, respectively. The server 10 preferably stores each traffic data hit 11 in a log file 15, although a database 16 or other storage structure can be used.

To analyze the traffic data, the server 11 examines each traffic data hit 11 and stores the access information obtained from the traffic data as analysis results 18A-C. Five sources of traffic data 11 (remote system 12, dial-up connection 14, log file 15, database 16 and direct connection 17) are shown. Other sources are also possible. The traffic data hits 11 can originate from any single source or from a combination of these sources. While the server 10 receives traffic data hits 11 continuously, separate sets of analysis results 18A-C are stored for each discrete reporting period, called a time slice. The analysis results 18A-C are used for generating summaries 19A-C of the access information.

In the described embodiment, the server 10 is typically an INTEL PENTIUM-based computer system equipped with a processor, memory, input/output interfaces, a network interface, a secondary storage device and a user interface, preferably such as a keyboard and display. The server 10 typically operates under the control of either the MICROSOFT WINDOWS NT or UNIX operating systems and executes either MICROSOFT Internet Information Server or NETSCAPE COMMUNICATIONS SERVER software. PENTIUM, MICROSOFT, WINDOWS, WINDOWS NT, UNIX, NETSCAPE AND NETSCAPE COMMUNICATIONS SERVER are trademarks of their respective owners. However, other server 10 configurations varying in hardware, such as DOS-compatible, APPLE MACINTOSH, SUN WORKSTATION and other platforms, in operating systems, such as MS-DOS, UNIX and others, and in web software are also possible. APPLE, MACINTOSH, SUN and MS-DOS are trademarks of their respective owners.

FIG. 2 is a flow diagram of a method 20 for analyzing traffic data in a distributed computing environment according to the present invention using the system of FIG. 1. Its purpose is to continuously collect and summarize access information from traffic data hits 11 while allowing on-demand, ad hoc analyses. The method 20 consists of two routines. Access information is collected from traffic data hits 11 and summarized by the server 10 into analysis results 18A-C (block 21), as further described below with reference to FIG. 6. The access information is separately analyzed for generating the summaries 19A-C which identify trends, statistics and other information (block 22), as further described below with reference to FIGS. 9A and 9B. The collection and summarizing of the access information (block 21) is performed continuously by the server 10 while the analysis of the access information (block 22) is performed on an ad hoc basis by either the server 10 or a separate workstation (not shown).

The method 20 is preferably implemented as a computer program executed by the server 10 and embodied in a storage medium comprising computer-readable code. In the described embodiment, the method 20 is written in the C programming language, although other programming languages are equally suitable. It operates in a MICROSOFT WINDOWS environment and can analyze Common Log File, Combined Log File and proprietary log file formats from industry standard web servers, such as those licensed by NETSCAPE, NCSA, O'REILLY WEBSITE, QUARTERDECK, C-BUILDER, MICROSOFT, ORACLE, EMWAC, and other WINDOWS 3.x, WINDOWS NT 95, UNIX and MACINTOSH WEB servers. The analysis results 18A-C can be stored in a proprietary or standard database 16 (shown in FIG. 1), such as SQL, BTRIEVE, ORACLE, INFORMIX and others. The method 20 uses the analysis results 18A-C of traffic data hits 11 as collected into the log file 15 or database 16 for building activity, geographic, demographic and other summaries 19A-C, such as listed below in Table 1. Other summaries 19A-C are also possible.

TABLE 1

| | |
|---|---|
| User Profile by Regions | General Statistics Table |
| Top Requested Pages | Least Requested Pages |

TABLE 1-continued

| | |
|---|---|
| Top Entry Pages | Top Exit Pages |
| Single Access Pages | Top Paths Through Site |
| Advertising Views | Advertising Clicks |
| Advertising Views and Clicks | Most Downloaded Files |
| Most Active Organizations | Most Active Countries |
| Activity Summary by Day of Week | Activity Summary by Day |
| Activity Summary by Hour of the Day | Activity Summary Level by Hours of the Day |
| Web Server Statistics and Analysis | Client Errors |
| Top Downloaded File Types and Sizes | Server Errors |
| Activity by Organization Type | Top Directories Accessed |
| Top Referring Sites | Top Referring URLs |
| Top Browsers | Netscape Browsers |
| Microsoft Explorer Browsers | Visiting Spiders |
| Top Platforms | |

In addition, the analysis results 18A-C can be used for automatically producing reports and summaries which include statistical information and graphs showing, by way of example, user activity by market, interest level in specific web pages or services, which products are most popular, whether a visitor has a local, national or international origin and similar information. In the described embodiment, the summaries 19A-C can be generated as reports in a variety of formats. These formats include hypertext markup language (HTML) files compatible with the majority of popular web browsers, proprietary file formats for use with word processing, spreadsheet, database and other programs, such as Microsoft Word, Microsoft Excel, ASCII files and various other formats. Word and Excel are trademarks of Microsoft Corporation, Redmond, Wash.

FIG. 3A shows a format used in storing a "hit" of raw traffic data 11 received by the server of FIG. 1. A raw traffic data hit 11 is not in the format shown in FIG. 3A. Rather, the contents of each field in the format is determined from the data packets exchanged between the server 10 and the source of the traffic data hit 11 and the information pulled from the data packets is stored into a data record using the format of FIG. 3A prior to being stored in the log file 15 (shown in FIG. 1) or processed.

Each traffic data hit 11 is a formatted string of ASCII data. The format is based on the standard log file format developed by the National Computer Security Association (NCSA), the standard logging format used by most web servers. The format consists of seven fields as follows:

| Field Name | Description |
|---|---|
| User Address (30): | Internet protocol (IP) address or domain name of the user accessing the site. |
| RFC931 (31): | Obsolete field usually left blank, but increasingly used by many web servers to store the host domain name for multi-homed log files. |
| User Authentication (32): | Exchanges the user name if required for access to the web site. |
| Date/Time (33): | Date and time of the access and the time offset from GMT. |
| Request (34): | Either GET (a page request) or POST (a form submission) command. |
| Return Code (35): | Return status of the request which specifies whether the transfer was successful. |
| Transfer Size (36): | Number of bytes transferred for the file request, that is, the file size. |

In addition, three optional fields can be employed as follows:

| Field Name | Description |
|---|---|
| Referring Site (37): | URL used to obtain web site information for performing the "hit." |
| Agent (38): | Browser version, including make, model or version number and operating system. |
| Cookie (39): | Unique identifier permissively used to identify a particular user. |

Other formats of traffic data hits 11 are also possible, including proprietary formats containing additional fields, such as time to transmit, type of service operation and others. Moreover, modifications and additions to the formats of raw traffic data hits 11 are constantly occurring and the extensions required by the present invention to handle such variations of the formats would be known to one skilled in the art.

Figures 3B, 4:
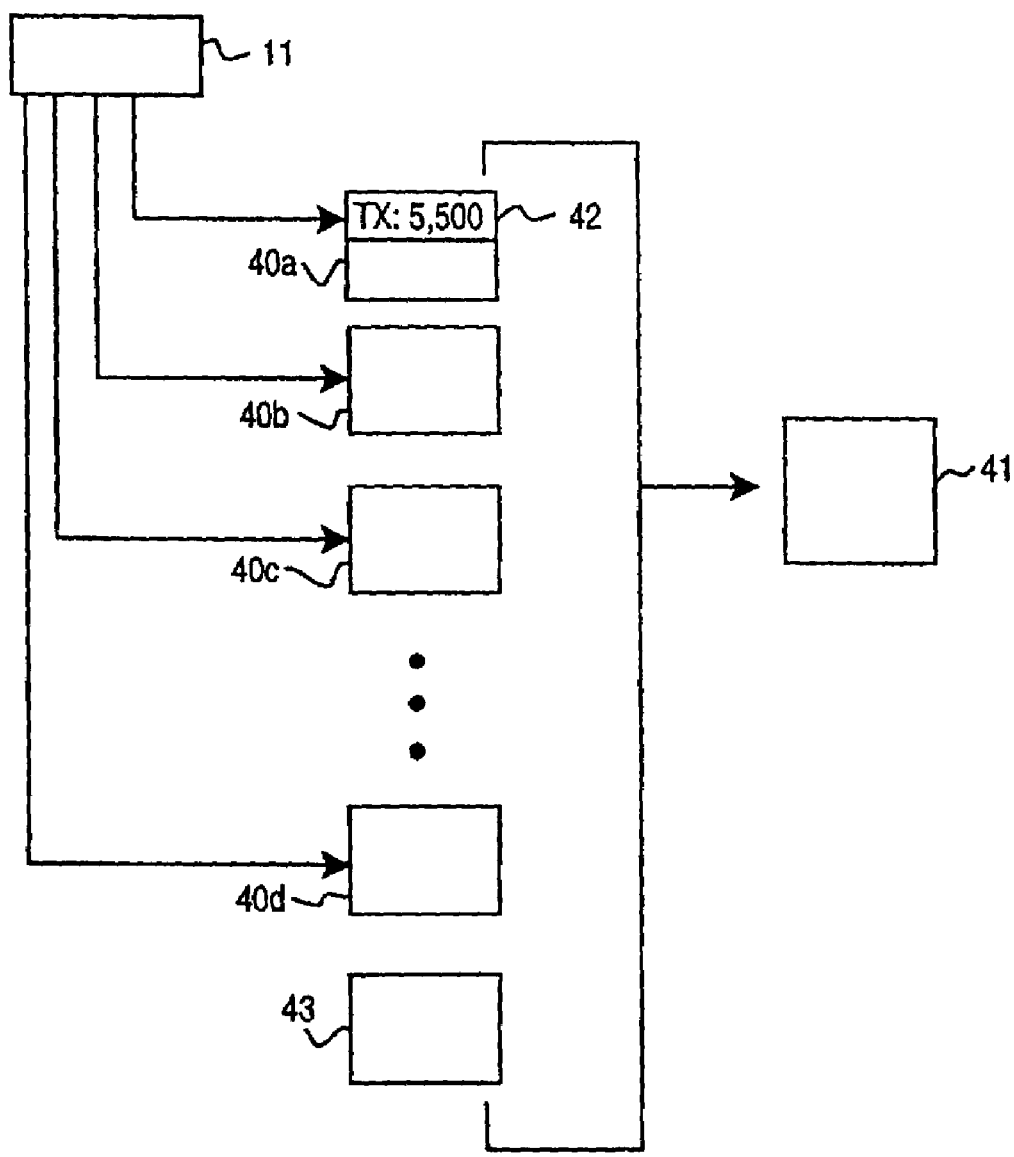
FIG. 3B shows, by way of example, a "hit" of formatted traffic data received by the server of FIG. 1.
FIG. 4 is a block diagram of the data structures used in storing access information determined from the traffic data hits of FIG. 3A.

FIG. 3B shows, by way of example, a "hit" of raw traffic data received by the server of FIG. 1. The user address 30 field is "tarpon.gulfnet" indicating the user originates from a domain named "gulf.net" residing on a machine called "tarpon." The RFC931 31 and user authorization 32 fields are "-" indicating blank entries. The Date/Time 33 field is "12/Jan./ 1996:20:38:17+0000" indicating an access on Jan. 12, 1996 at 8:38:17 pm GMT. The Request 34 field is "GET/general.htm HTTP/1.0" indicating the user requested the "general.htm" page. The Return Code 35 and Transfer Size 36 fields are 200 and 3599, respectively, indicating a successful transfer of 3599 bytes.

FIG. 4 is a block diagram of the data structures used in storing access information determined from the traffic data hits 11 of FIG. 3A. Users continuously access the server 10 during which time the server 10 receives a series of "hits" from remote users for exchanging information, such as accessing a web page or posting a file. Users are identified by the user's internet protocol (IP) address or domain name. The time during which the user is actively accessing the server 10 is known as a session. An open session is defined as a period of active activity for one user of the server 10. By default, a user session is terminated when a user falls inactive for more than 30 minutes, although other time limits are equally suitable. An open user session can span two or more time slices which can artificially inflate the open session count during the analysis of the access information (block 22) as further described below with reference to FIG. 11.

Each traffic data hit 11 is parsed to obtain pertinent access information. While a traffic data hit 11 mainly contains formatted data as described with reference to FIG. 3A, access information is broader and includes data derived from the context of the "hit," such as the city or state of the referring site. In the described embodiment, a database of both U.S. and international Internet addresses (not shown), including full company name, city, state and country, is maintained for inferring such indirect access information about each user. The access information is then used to populate a set of results tables 40A-D. Each table stores a particular type of access information, such as the state, city or country of the user, the page within the web site being accessed, the source web site, a Universal Resource Locator (URL) and other information either directly or inferentially derivable from the traffic data hit 11. At the end of the time slice, the results tables 40A-D are summarized into a container file 41, further described below with reference to FIG. 5, which is stored in the analysis results 18A-C.

The results tables 40A-C are categorized according to the type of access information being counted and each results table 40A contains a set of records 42 for storing the access information. In the described embodiment, there are two types of tables. Static tables contain a fixed and predefined set of records 42, such as the set of pages in the web site being measured. Dynamic tables are of an undetermined length and can have zero or more records. A new record 42 must be created in the results table 40A each time new access information is encountered.

For example, in a dynamic results table 40A for storing the state from which the user originates, a record might contain "TX: 5, 500" indicating the user's state is Texas with five user sessions and 500 hits recorded so far. If the next traffic data hit 11 originates from a new user from Texas, this record 42 will be updated to "TX: 6, 501" indicating six user sessions with 501 hits. If the next traffic data hit 11 originates from yet another new user from California, a new record 42 will be created containing "CA: 1, 1" indicating the user's state is California with one user session and one hit. In addition to the set of results tables 40A-D, the server 10 maintains a user session table 43 for tracking the open user sessions during each time slice which is used in a further embodiment described below with reference to FIGS. 12-13.

Figure 5:
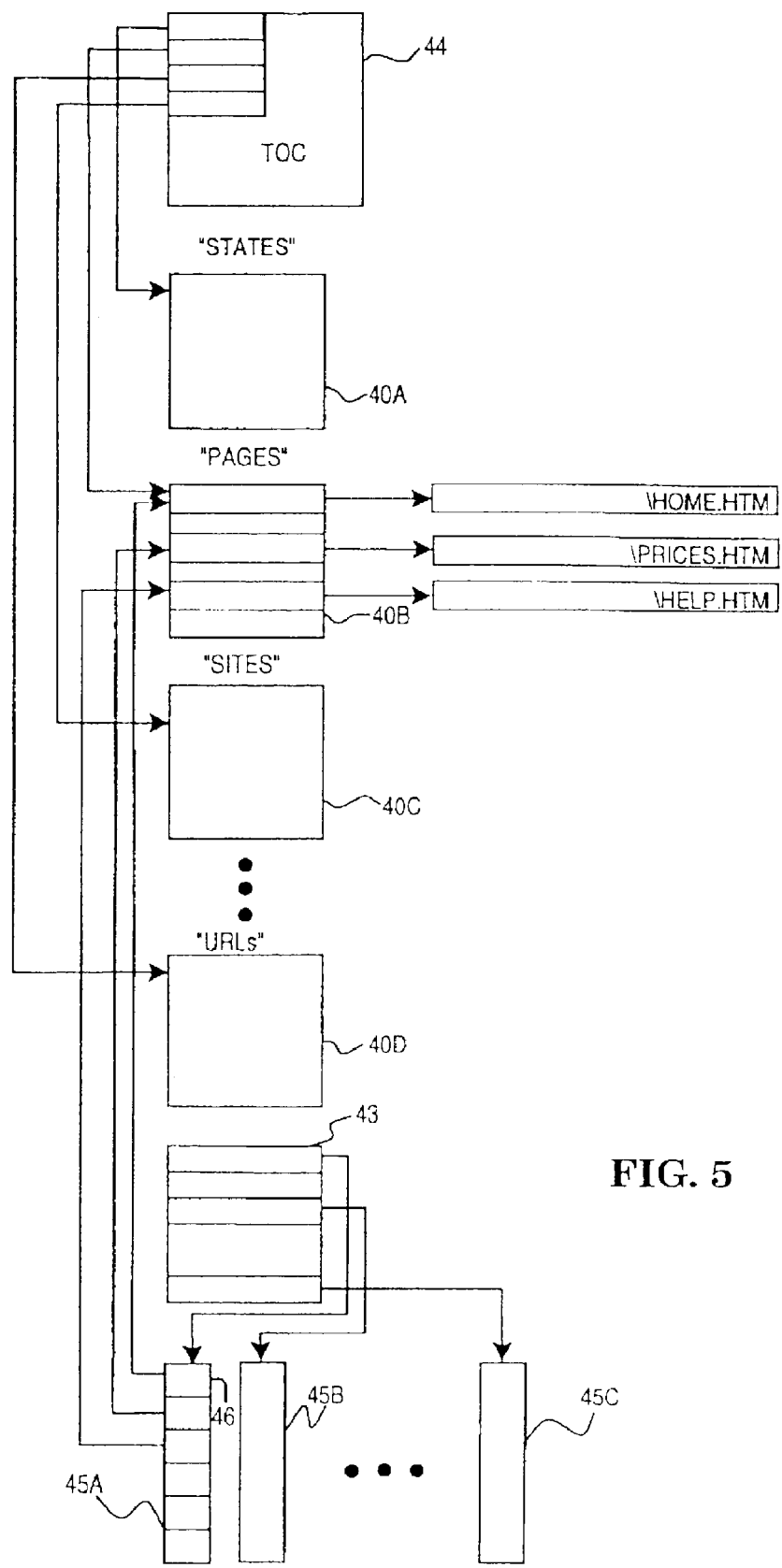
FIG. 5 is a block diagram of a container file storing the access information in the analysis results of FIG. 1.

FIG. 5 is a block diagram of a container file 41 storing the access information in the analysis results 18A-C of FIG. 1. Each container file 41 contains a table of contents 44 mapping out the relative locations of each results table 40A-D within the container file 41. The user session table 43 is also stored in the container file 41 and contains a series of pointers to a set of microtables 45A-C. Each microtable 45A-C corresponds to one of the results tables 40A-D potentially containing an inflated count of open sessions. Each entry in a microtable 45A contains an index 46 pointing to a record within its associated results table 40B which requires adjustment for inflation. However, not every results table 40A-D has an associated microtable 45A-C. Rather, the total number of microtables 45A-C is less than or equal to the number of results tables 40A-D since every results table 40A-D does not contain inflated information.

For example, the state from which a user originates is counted once during each session. Since it is only counted once, the number of open user sessions for any given state is not inflated. Consequently, no microtable 45 is needed for the results table 40A for states. Conversely, a page in a web site can be accessed numerous times during an open session. Thus, a microtable 45A is required. A count of the number of open sessions spanning each time slice boundary is made in the user session table 43, as described below with reference to FIG. 12 and an entry is made in the user session table 43 pointing to a corresponding microtable 45A. In turn, each entry within the microtable 45A contains an index to a particular record within the results table 40b for web pages. During analysis, the access information is adjusted to remove the inflation as described below with reference to FIG. 13.

Figure 6:
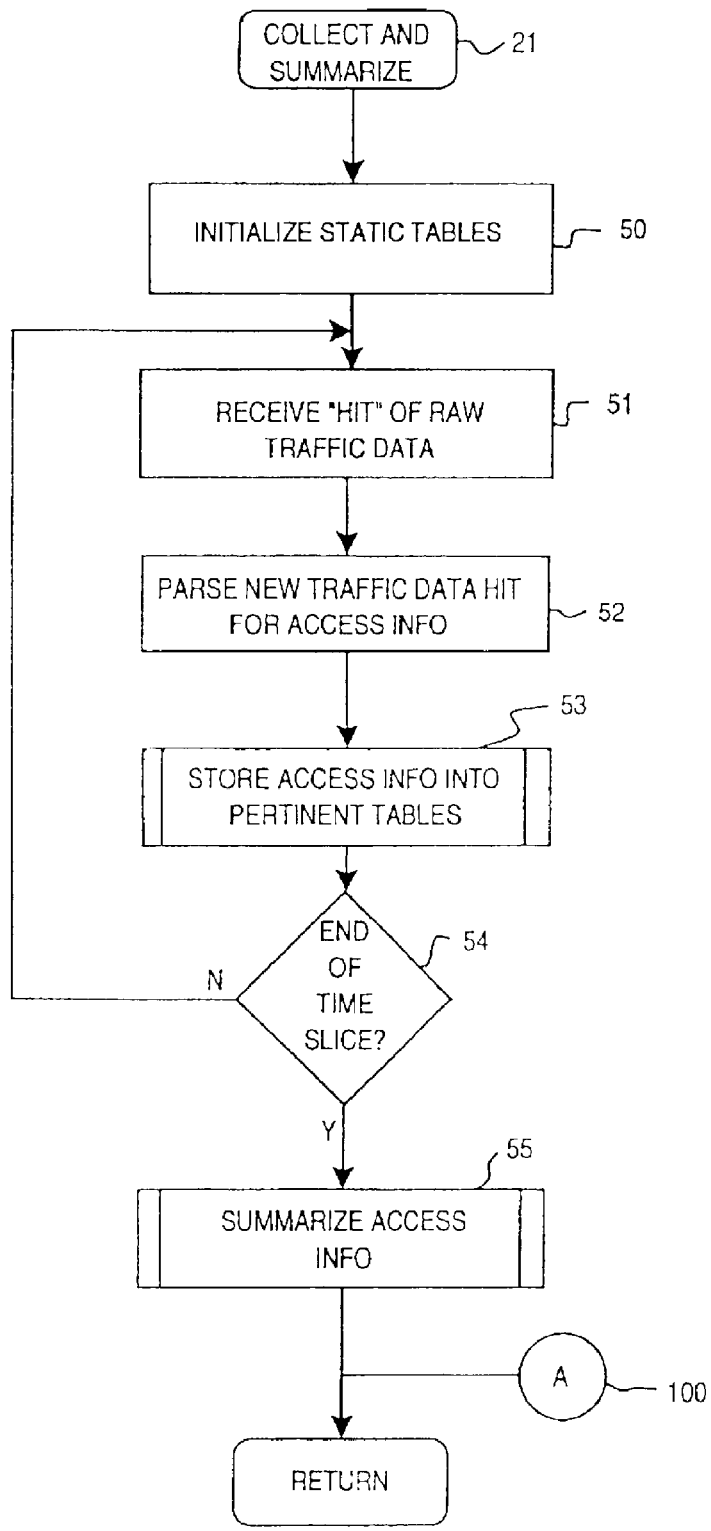
FIG. 6 is a flow diagram of a routine for collecting and summarizing access information used in the method of FIG. 2.

FIG. 6 is a flow diagram of a routine for collecting and summarizing access information (block 21) used in the method of FIG. 2. Its purpose is to iteratively process traffic data hits 11 during the current time slice and to thereafter summarize the results. The access information is not adjusted for inflation due to the double, triple or multiple counting of open sessions spanning multiple time slices. Inflation adjustment is unnecessary if the access information being summarized is counted just once. However, a further embodiment of the present method is described below with reference to FIGS. 11 and 12 for adjusting the analysis results for inflation where such adjustment is needed.

The routine is executed by the server 10 once during each time slice. First, the static results tables 40A-D, if any, are initialized (block 50). The routine then enters a processing loop (blocks 51-54) for continuously handling a stream of traffic data hits 11. A "hit" of raw traffic data 11 is received (block 51) in the log file format described with reference to FIG. 3A. In the described embodiment, 99% of the traffic data hits 11 are received from the log file 15 (shown in FIG. 1), although the traffic data hits 11 could also be received from other sources. Next, the raw traffic data 11 is parsed for access information (block 52). Access information includes but is not limited to the contents of the fields of the log file format described with reference to FIG. 3A. In addition, the access information includes contextual information derived from the hit, such as the particular web page accessed, the day of the week, the hour of the day and so forth. The access information is stored into the pertinent results table 40A-D (block 53) as further described below with reference to FIG. 7. If the current time slice has not yet ended (block 54), processing continues with the next traffic data hit 11 at the top of the processing loop (blocks 51-54). Otherwise, if the time slice has ended (block 54), the access information is summarized into a container file 41 (block 55), as further described below with reference to FIG. 8 and the routine returns.

Figure 7:
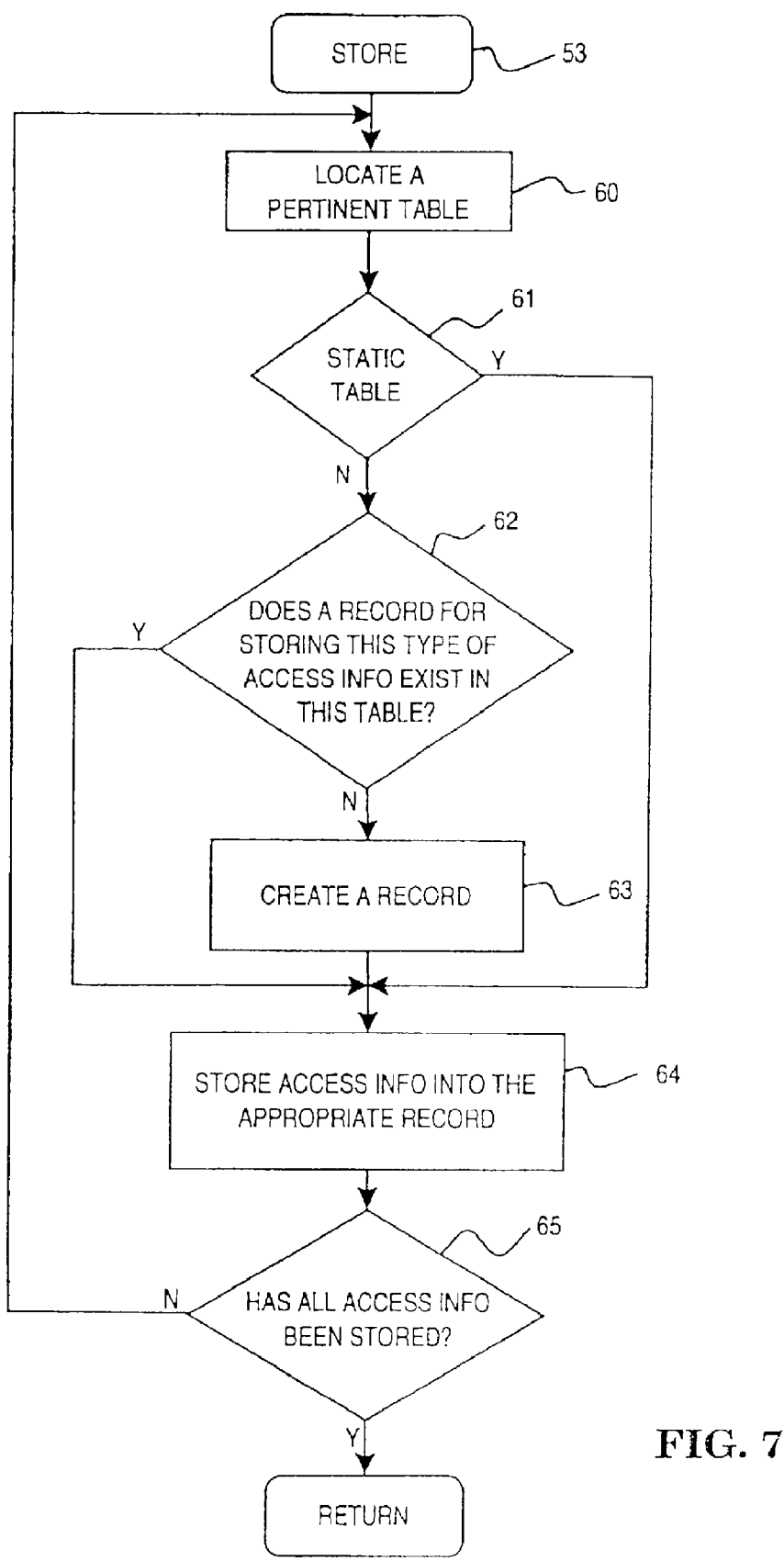
FIG. 7 is a flow diagram of a routine for storing access information used in the routine of FIG. 6.

FIG. 7 is a flow diagram of a routine for storing the access information (block 53) used in the routine of FIG. 6. Its purpose is to iteratively populate each of the results tables 40A-D with the access information parsed and inferred from each traffic data hit 11. The access information is categorized according to the results tables 40A-D. The routine enters a processing loop (blocks 60-65) for continuously populating a results table 40A with access information, if appropriate. Thus, a pertinent results table 40A is located (block 60). If the results table 40A is not static (block 61) and a record for storing this type of access information does not exist in this results table 40A (block 62), a record is created (block 63). Otherwise, if the results table 40A is dynamic (block 61) or if the results table 40A is static yet a record for storing this type of access information already exists (block 62), the access information is stored into the record for storing this type of access information in the results table 40A (block 64). If all the access information for the current traffic data hit 11 has not been stored in to a results table 40A (block 65), processing continues at the top of the processing loop (blocks 60-65). Otherwise, if all access information has been stored (block 65), the routine returns.

Figure 8:
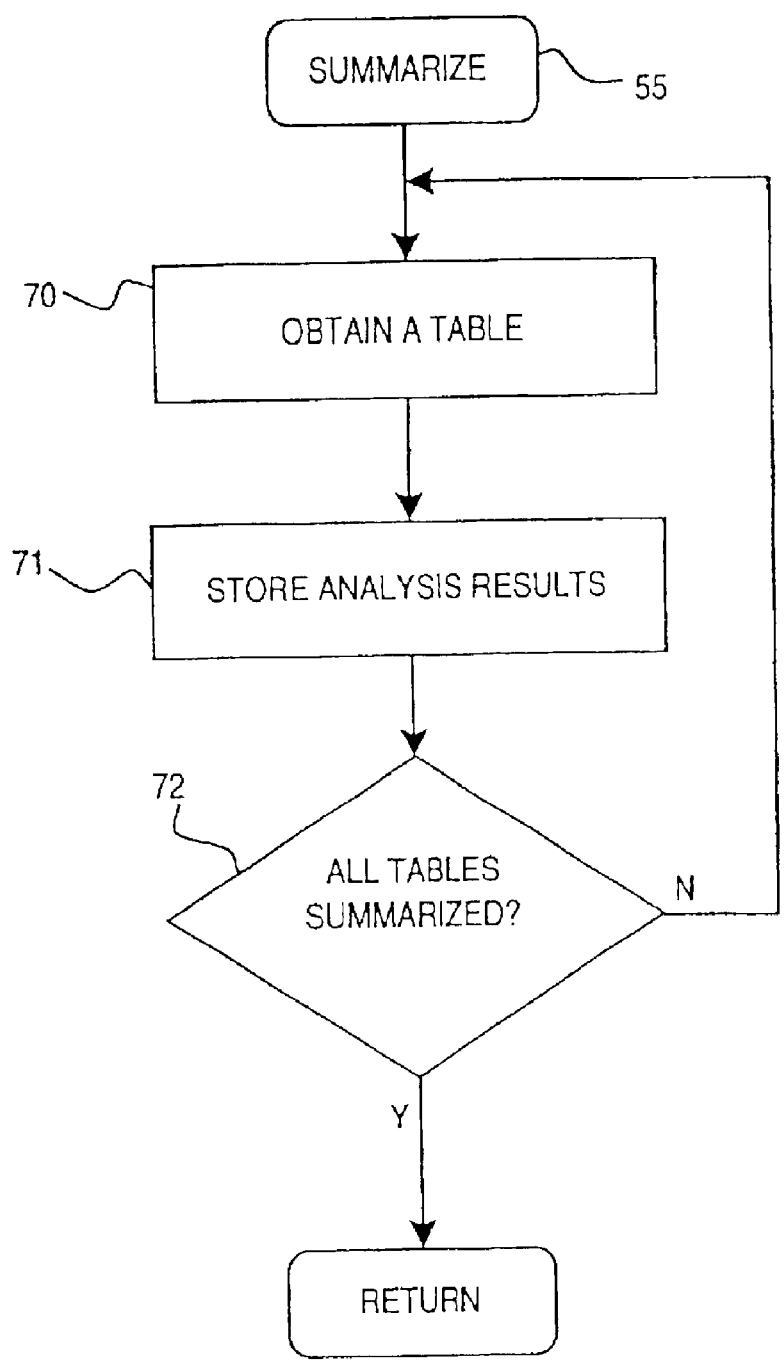
FIG. 8 is a flow diagram of a routine for summarizing access information used in the routine of FIG. 6.

FIG. 8 is a flow diagram of a routine for summarizing access information (block 55) used in the routine of FIG. 6. Its purpose is to iteratively summarize each of the results tables 40A-D into a container file 41 stored with the analysis results 18A-C (shown in FIG. 1). The routine enters a processing loop (blocks 70-72) for continuously summarizing each results table 40A. Thus, a results table 40A is obtained (block 70). The results table 40A is stored into a container file 41 by copying the results table 40A into the container file 41 and updating the table of contents 44 of the container file 41 to reflect the relative position of the results table 40A within the container file 41. If all of the results tables 40A-D have not been summarized (block 72), processing continues at the top of the processing loop (blocks 70-72). Otherwise, if all of the results tables 40A-D have been summarized (block 72), the routine returns.

In the two preceding routines for respectively storing and summarizing access information, described with reference to FIGS. 7 and 8, respectively, an iterative loop (blocks 60-65 in FIG. 7 and blocks 70-72 in FIG. 8) was employed for sequentially processing each of the results table 40A-D. However, a further embodiment of the present invention uses a selection statement instead of a looping construct to directly access each results table 40A.

Figure 9A:
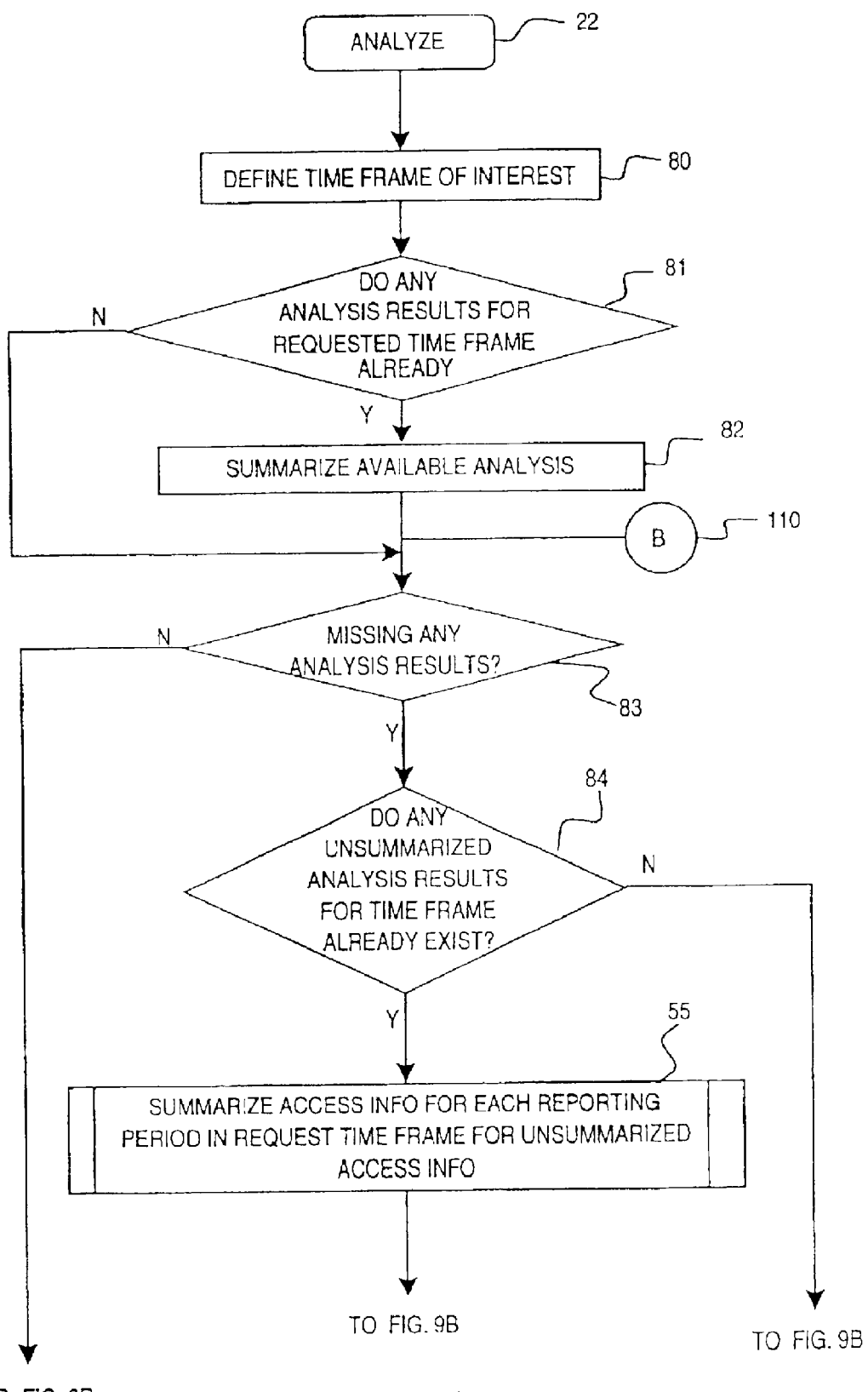
FIGS. 9A and 9B are a flow diagram of a one-pass routine for analyzing access information used in the method of FIG. 2.
Figure 9B:
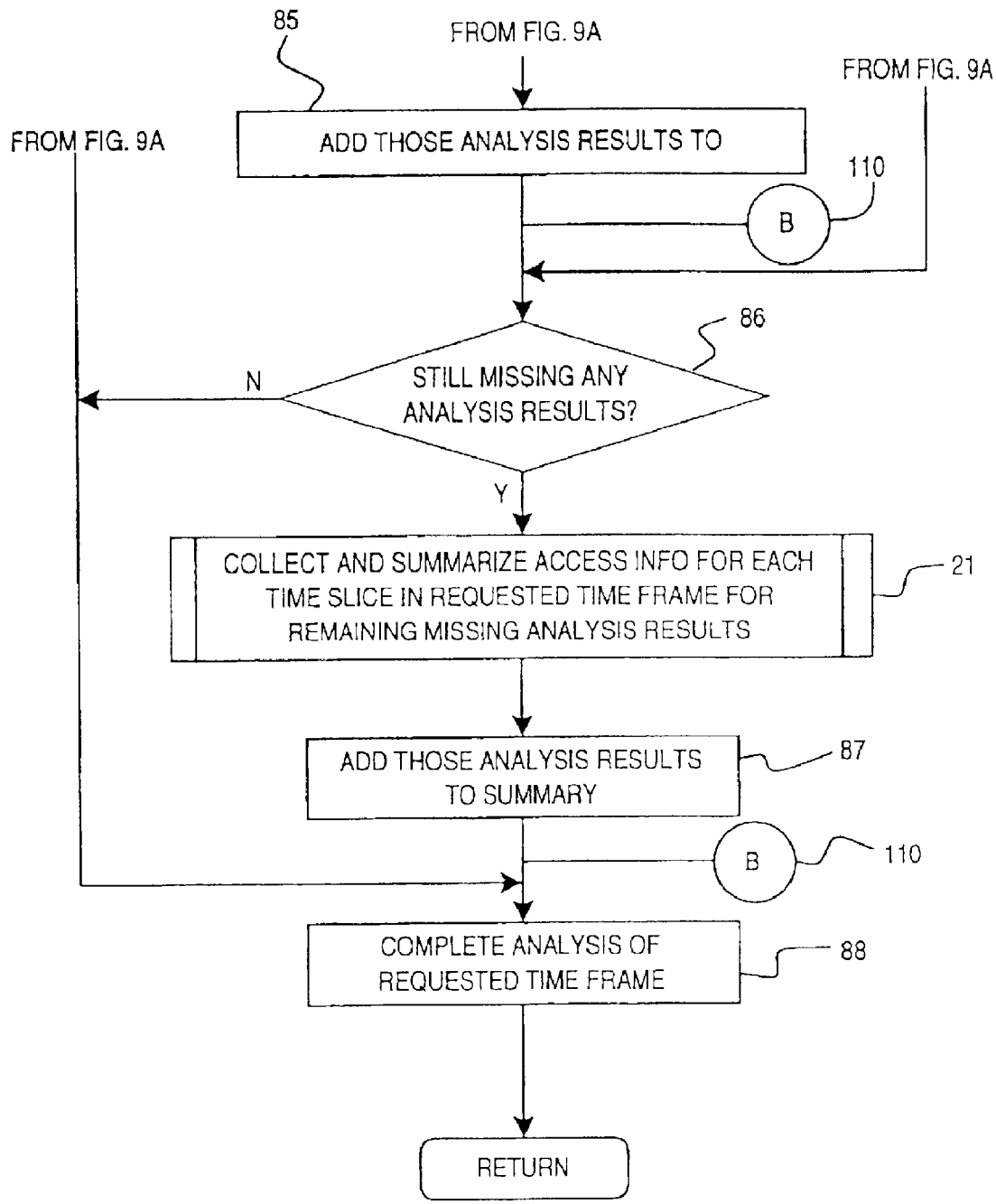
Figure 10:
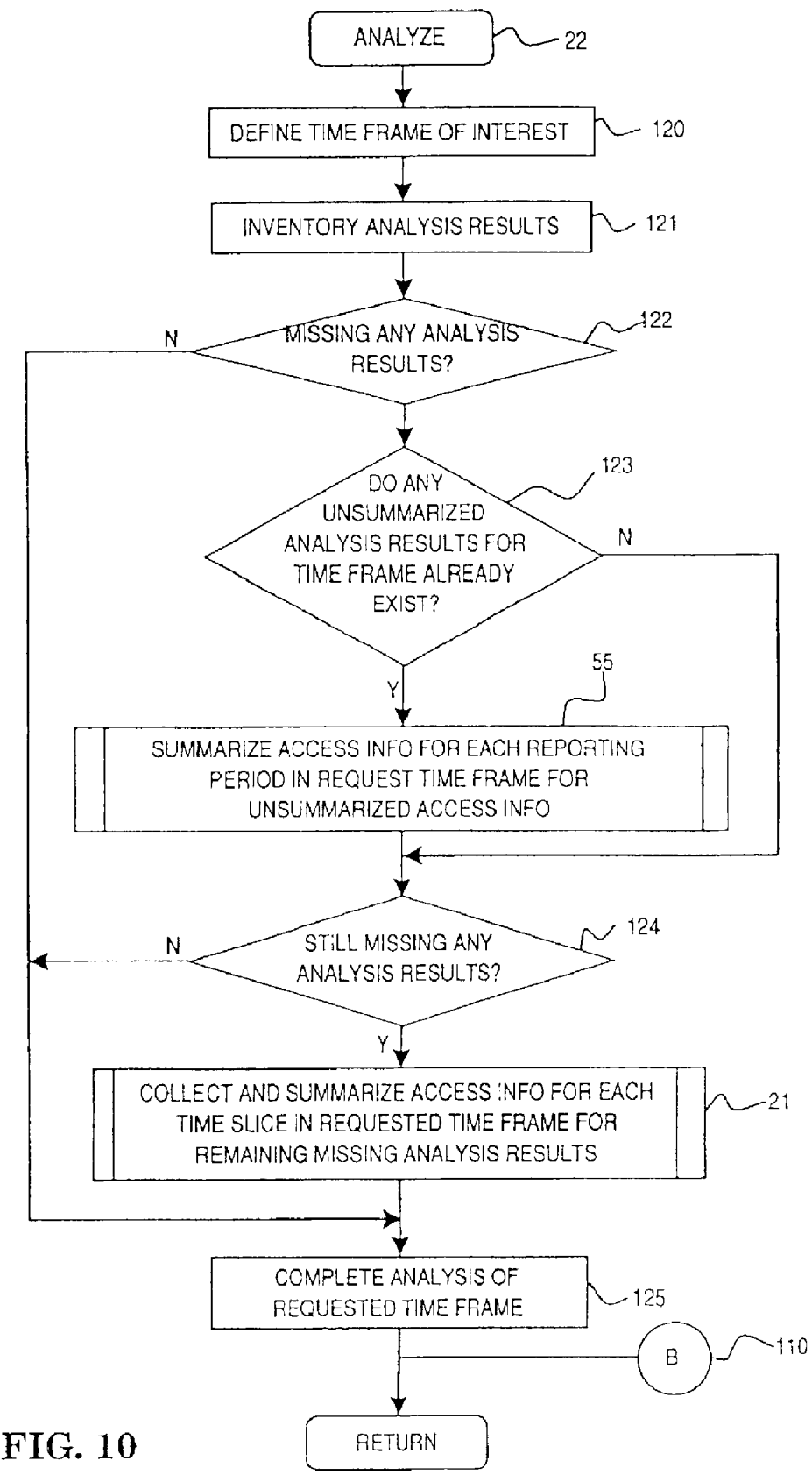
FIG. 10 is a flow diagram of a two-pass routine for analyzing access information used in the method of FIG. 2.

FIGS. 9A and 9B and FIG. 10 are flow diagrams respectively of one-pass and two-pass routines for analyzing access information used in the method of FIG. 2. The one-pass routine (FIGS. 9A and 9B) minimizes the number of data accesses performed in analyzing the access information. The two-pass routine (FIG. 10) minimizes the number of program variables required. Either routine is equally suitable for analyzing the access information depending upon the particular configuration of the server 10 or workstation (not shown) used to perform the analysis.

FIGS. 9A and 9B are the flow diagram of a one-pass routine for analyzing access information (block 22) used in the method of FIG. 2. Its purpose is to analyze and summarize the access information recorded for a user-requested time frame on an ad hoc basis in a single pass through the analysis results 18A-C. The time frame can be smaller than, equal to or larger than the time slice used by the access information collection and summarization routine (block 21 in FIG. 2). The routine automatically divides the requested time frame into smaller time slices and stores the analysis summaries for each of the time slices to allow greater flexibility and speed in subsequent reports of the same or related time frame.

Briefly, the routine creates a container file 41 for storing summarized access information for the requested time frame if such a container file 41 does not already exist in the analysis results 18A-C (shown in FIG. 1). The new container file 41 is maintained in the analysis results 18A-C for immediate access in subsequent requests and re-analysis of the time slices is avoided.

The routine is hierarchically structured according to increasing processing demand based on the availability of summarized access information in the analysis results 18A-C. At the bottom of the hierarchy (blocks 81-82), the routine uses any available analysis results 18A-C stored in a container file 41. At the next level of the hierarchy (blocks 83-85), the routine summarizes collected but unsummarized access information. At the top of the hierarchy (blocks 86-87), the routine collects and summarizes raw traffic data hits 11. This hierarchical structuring enables the server 10 to efficiently analyze the traffic data by utilizing existing summaries 19A-C whenever possible and thereby avoid the need to process raw traffic data 11 for each time slice in the time frame every time a new analysis request is made.

In the routine, the time frame of interest is defined (block 80). If any analysis summaries for the requested time frame already exist in a container file 41 stored in the analysis results 18A-C (block 81), the available analysis summaries are summarized (block 82). This step is skipped if no analysis summaries already exist (block 81). Next, if any analysis summaries are missing (block 83), the next stage in the hierarchy is performed. Specifically, if any unsummarized analysis results for the time frame already exist (block 84), the access information for each time slice in the requested time frame for the unsummarized analysis results are summarized (block 55), as described above with reference to FIG. 8. These analysis results are then added to the summary (block 85). However, these last two steps are skipped if no unsummarized analysis results for the time frame already exist (block 84). If analysis summaries are still missing (block 86), the last stage in the hierarchy is performed.

Specifically, access information for each time slice in the requested time frame for the remaining missing analysis results are collected and summarized (block 21), as described above with reference to FIG. 6. These analysis results are then added to the summary (block 87). Once no further analysis results are missing (blocks 83 and 86), the analysis of the requested time frame is complete (block 88) and the routine returns.

FIG. 10 is the flow diagram of a two-pass routine for analyzing access information used in the method of FIG. 2. Its purpose is to analyze and summarize the access information recorded for a user-requested time frame on an ad hoc basis in two passes through the analysis results 18A-C. The first pass (blocks 121-21) "inventories" available analysis results 18A-C and creates any missing analysis summaries as needed. The second pass (block 125) collects and completes the analysis.

In the routine, the time frame of interest is defined (block 120). The analysis summaries for the requested time frame already existing in a container file 41 stored in the analysis results 18A-C are inventoried for determining any gaps in the data (block 12). If any analysis summaries are missing (block 122), the next stage in the hierarchy is performed. Specifically, if any unsummarized analysis results for the time frame already exist (block 123), the access information for each time slice in the requested time frame for the unsummarized analysis results are summarized (block 55), as described above with reference to FIG. 8. However, this step is skipped if no unsummarized analysis results for the time frame already exist (block 123). If analysis summaries are still missing (block 124), the last stage in the hierarchy is performed. Specifically, access information for each time slice in the requested time frame for the remaining missing analysis results are collected and summarized (block 21), as described above with reference to FIG. 6. The analysis of the requested time frame is then completed (block 125) and the routine returns.

Figure 11:
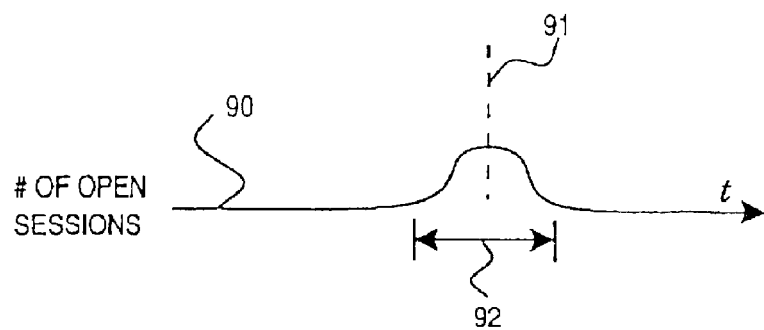
FIG. 11 is a graph of the number of open sessions as a function of time received by the server of FIG. 1.

FIG. 11 is a graph of the number of open sessions as a function of time received by the server of FIG. 1. As explained above, the method described with reference to FIGS. 6-9 assumes that the access information is not inflated by double, triple or multiple counting of open sessions spanning multiple time slices. This type of adjustment is unnecessary where the access information is counted only once during the entire user session. However, many types of traffic data hits 11, such as web page accesses, can result in multiple counting. In the graph shown in FIG. 11, the number of open sessions 90 is tallied as a function of time. Each new traffic data hit 11 causes an additional open session to be counted. The boundary between two time slices 91 straddles a "bump" 92 of multiply-counted open sessions which inflates the number of open sessions 90 counted. The "bump" 92 occurs because each open session is in effect counted twice, thrice or multiple times in the results tables 40A-D for each respective time slice. The net result is an inflated figure for the number of open sessions during which the item of interest was accessed.

For example, assume the server 10 saves analysis results 18A once for each 24 hour time slice starting at 00:00:00 and ending at 23:59:59. Users that visit the server 10 from, for instance, 23:50:00 until 00:30:00 will be registered twice: once in the analysis results 18A for the first time slice and once in the analysis results for the second time slice. Thus, suppose the item of interest is the number of open sessions during which a particular web page was accessed and the time frame on interest was just the first and second time slice. Each new traffic data hit 11 for this web page requested by a user with an open session falling between 23:50:00 and 00:30:00 will result in a double-count for the second time slice if that user already accessed this web page during the first time slice. The summary of the time frame of the first and second time slice will be inflated unless the double-counts are subtracted from the number of open sessions for this web page for the second time slice.

To resolve this problem, a further embodiment of the present invention introduces additional steps into the method described with reference to FIGS. 6-9 to "remember" and store with each analysis summary the number of open sessions visits remaining at the end of the time slice. This allows the method to count those open sessions spanning two or more time slices and deinflate the analysis summaries accordingly.

For example, if a user is visiting the server 10 from Day X at 23:50:00 to Day X+1 at 00:30:00, the server 10 will store the user identifier, such as the user's name, IP address, cookie or other indication, with the analysis summary of Day X. Later, when the analysis summary for Day X and Day X+1 are combined, the number of open sessions can be adjusted to compensate any multiple counting.

Figure 12:
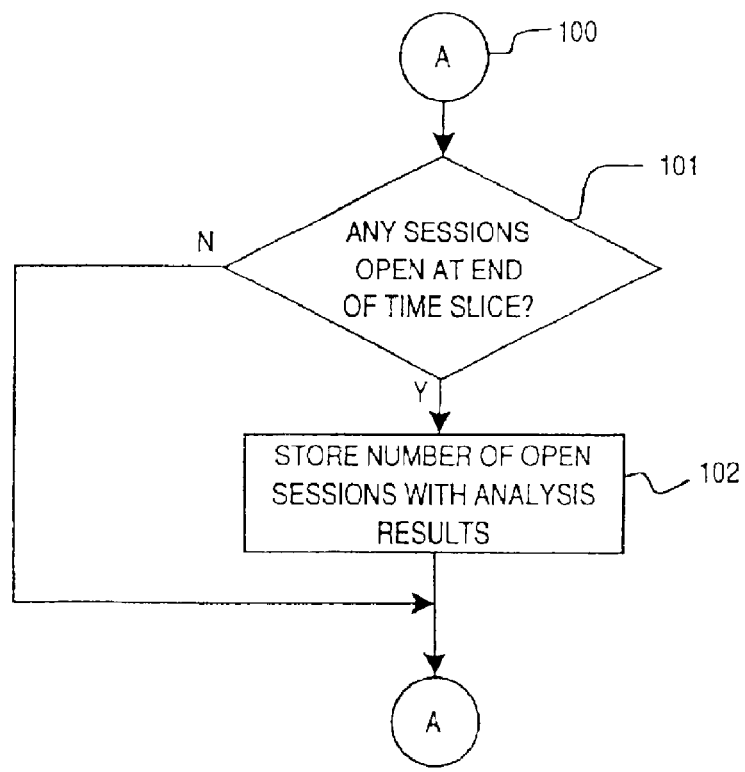
FIG. 12 is a flow diagram of steps for adjusting the collection of access information for inflation used in the routine of FIG. 6.

The additional steps are introduced into both the routine for collecting and summarizing access information (block 21 in FIG. 2) for "remembering" any multiple counts and the routine for analyzing the access information (block 22 in FIG. 2) for adjusting the open session counts during analysis. FIG. 12 is a flow diagram of steps for adjusting the collection of access information for inflation used in the routine of FIG. 6 which are inserted after the step of summarizing the access information (block 55). Thus, if there are any sessions open remaining at the end of the time slice (block 101), the number of open sessions are stored with the analysis results and the user session table 43 is updated with the relative location of each of the associated microtables 45A-D in the container file 41 (block 102). Otherwise, if no open sessions exist (block 101), no further steps need be taken.

Figure 13:
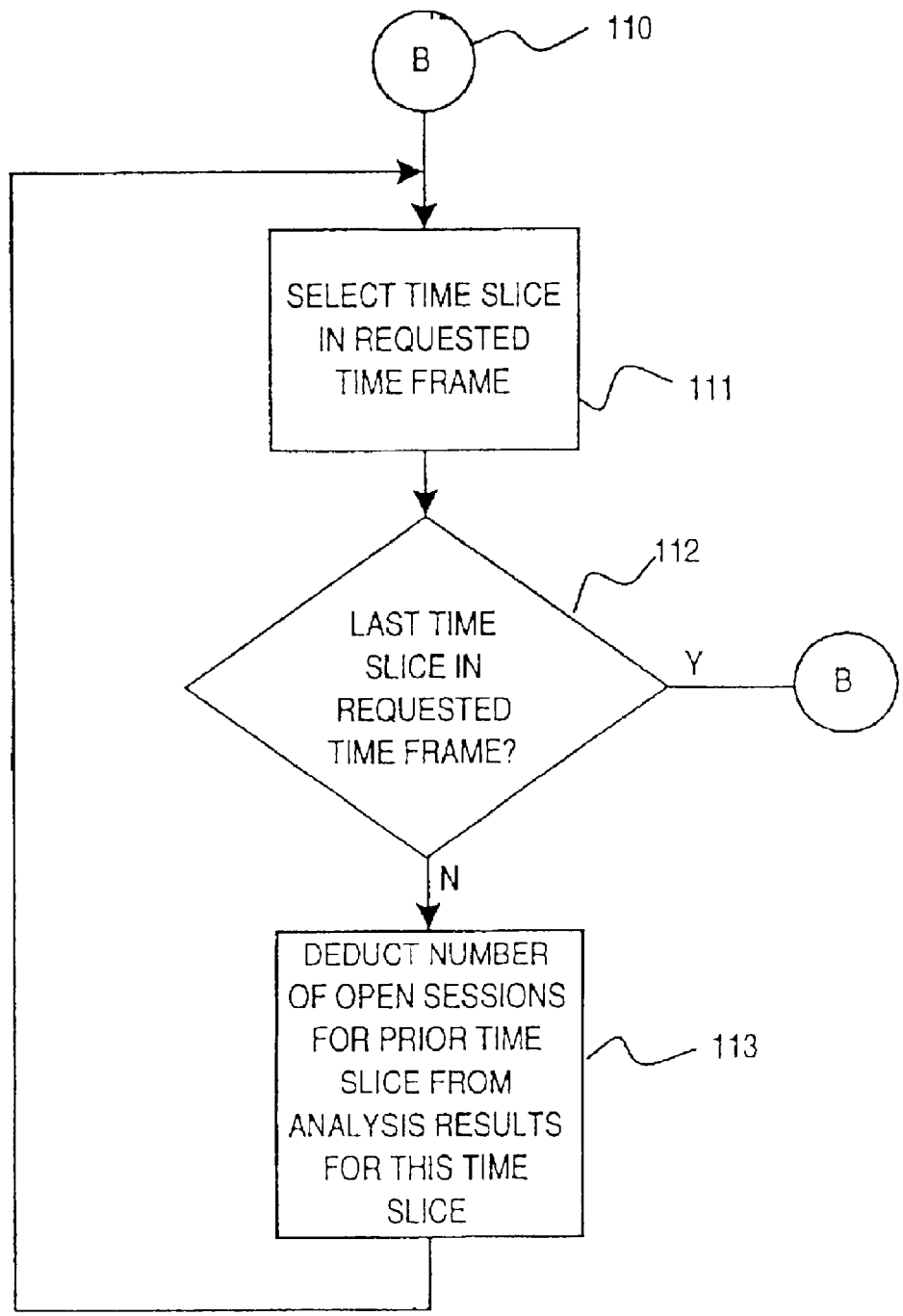
FIG. 13 is a flow diagram of steps for adjusting the analysis of access information for inflation used in the routine of FIGS. 9A and 9B and 10A-B.
Figures 3B, 4:
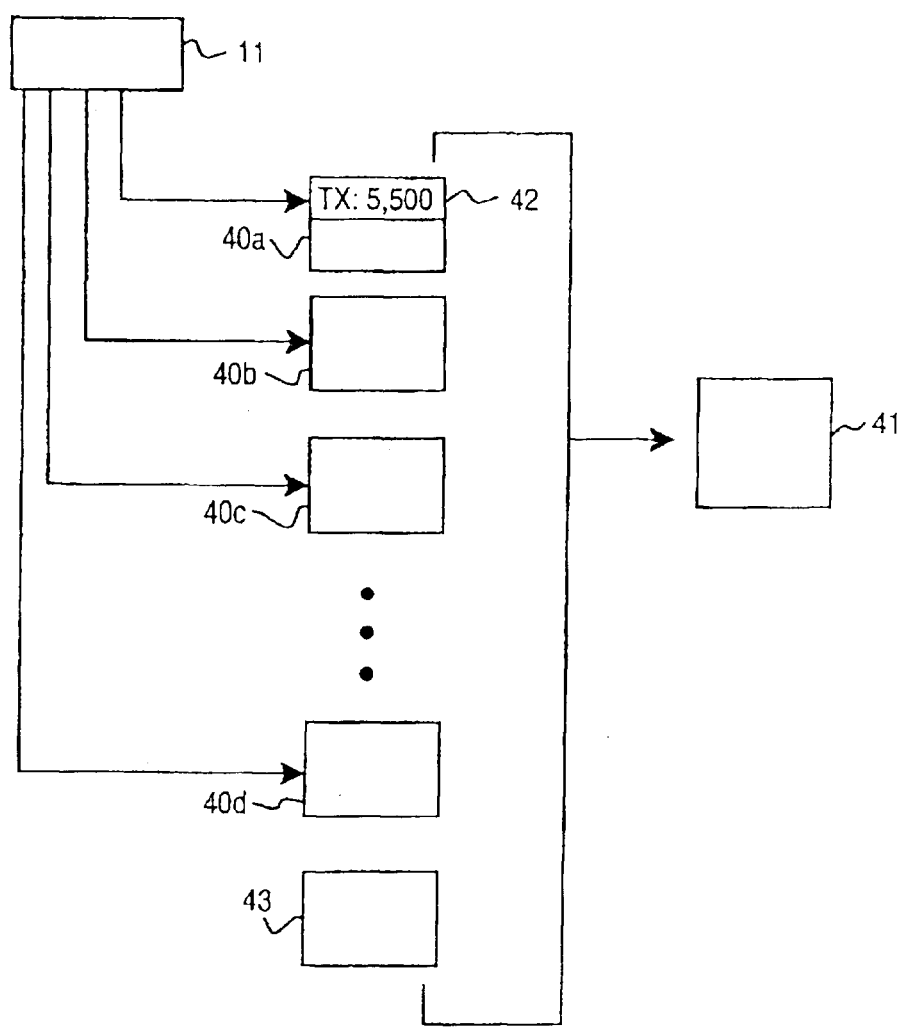

FIG. 13 is a flow diagram of steps for adjusting the analysis of access information for inflation used in the routines of FIGS. 9A, 9B and 10 which are inserted after each step during which the summary of analysis results is updated (blocks 82, 85 and 87 in FIGS. 9A and 9B and block 127 in FIG. 10). Thus, the time slice in the requested time frame is selected (block 111). If this is not the last time slice in the requested time frame (block 112), the number of open sessions for the prior time slice is deducted from the analysis results for the current time slice (block 112), thereby deinflating the count and processing continues with the next time slice in the requested time frame (block 111). Otherwise, if this is the last time slice in the requested time frame (block 112), processing is complete.

In the described embodiment, the number of open sessions corresponding to certain types of data values collected for use in the summaries 19A-C (listed in Table 1) are counted just once. These are the data types which are generally not likely to change and include, for example, the referring web site, city, state, country, day of the week, region, organization type, browser and operating system type. No microtables 45A-C are needed for adjusting the open session counts corresponding to these data types. However, the number of open sessions corresponding to all other types of data values are counted continuously throughout the user session. Microtables 45A-C are required for these data types.

Session counts are maintained for each of the summaries 19A-C regardless of the data type, although the session counts are not necessarily used during the analysis of the access information (block 22) to deinflate the corresponding results tables 40A-D. Also, no microtables 45A-C are maintained for these non-adjusted results tables 40A-D. However, to convert non-adjusted results tables 40A-D to adjusted results tables 40A-D merely requires forming an associated microtable 45A. This conversion would be necessary where, for instance, a data type formerly counted once per session is modified to allow for continuous counting.

Having described and illustrated the principles of the invention in a preferred embodiment thereof, it should be apparent that the invention can be modified in arrangement and detail without departing from such principles. We claim all modifications and variations coming within the spirit and scope of the following claims.

What is claimed is:

1. A system for analyzing traffic data in a distributed computing environment, the distributed computing environment comprising a plurality of interconnected systems, the interconnected systems including at least one hardware system, the interconnected systems operatively coupled to a hardware server, the server configured to receive hits from each interconnected system, comprising:
   one or more static results tables, each static results table comprising a plurality of records;
   one or more dynamic results tables categorized by an associated data type, each dynamic results table comprising a plurality of records;
   means for collecting each hit as access information into one such record in at least one dynamic results table according to the data type associated with the one such dynamic results table, each of the records in the dynamic results table corresponding to a different type of access information for the data type associated with the dynamic results table;
   means for summarizing periodically the access information collected into the dynamic results tables during a time slice into analysis results, the time slice corresponding to a discrete reporting period; and
   means for analyzing the access information from the dynamic results tables in the analysis results to form analysis summaries according to the data types associated with the dynamic results tables.

2. A system according to claim 1, wherein each such interconnected system interfaces to the server via one of a network connection, a point-to-point connection and a dedicated connection.

3. A system according to claim 1, wherein the server further comprises a log file operatively coupled to the server and storing the hits, the log file operating as a source of hits responsive to the collecting means.

4. A system according to claim 1, wherein the server further comprises a database operatively coupled to the server and storing at least one of the hits and the analysis results, the database operating as a source of hits responsive to the collecting means.

5. A system according to claim 1, further comprising:
   a user session table comprising one or more records which each store a pointer, each pointer corresponding to one of the dynamic results tables, the collecting means including a user session count for each such data type associated with each such dynamic results table, the user session count being stored in the user session table in each of the records; and
   one or more microtables, each of the microtables including one or more indices and being associated with one of the dynamic results tables, each such index within the microtable logically referring to each such different type of access information collected in the associated dynamic results table, each such pointer in the user session table further logically referring to one of the microtables, the analyzing means further comprising means for adjusting the user session count for consecutive time slices.

6. A system according to claim 5, further comprising:
a container file comprising a table of contents and configured to store the one or more static results tables, the one or more dynamic results tables, the user sessions table, and the one or more microtables, the summarizing means further comprising means for mapping relative positions of each such static and dynamic results table within the container file into the table of contents and storing each such pointer in the user session table with the relative positions of each such microtable within the container file.

7. A system according to claim 1 wherein the plurality of records in the static results tables includes a fixed and predefined set of records.

8. A computer-implemented method for analyzing traffic data in a distributed computing environment, the method comprising:
storing a plurality of traffic data hits in a storage structure associated with a hardware server;
initializing one or more static results tables;
parsing the traffic data hits from the storage structure associated with the hardware server to extract access information;
storing the access information in one of the static results tables or one of a plurality of dynamic results tables;
summarizing the access information into analysis results, wherein summarizing the access information comprises:
obtaining the results table containing the access information;
copying the results table containing the access information into a container file; and
updating a table of contents of the container file to reflect the relative position of the results table containing the access information within the container file; and
storing the analysis results in the container file.

9. The computer-implemented method of claim 8, wherein storing the plurality of traffic data hits comprises storing the traffic data hits in a log file associated with the storage structure, each traffic data hit is stored in a log file format, and the log file format comprises a plurality of fields.

10. The computer-implemented method of claim 9, wherein the access information includes the contents of the fields of the log file format.

11. The computer-implemented method of claim 8, wherein the access information includes contextual information derived from the traffic data hit.

12. The computer-implemented method of claim 8, further comprising defining a time slice and wherein storing the analysis results in the container file is performed when the time slice is ended.

13. The computer-implemented method of claim 8, wherein storing the access information comprises:

selecting a pertinent results table, the pertinent results table being one of the static results tables or one of the dynamic results tables;
identifying a type of the access information;
identifying a record corresponding to the type of the access information;
creating the record in the pertinent results table if the pertinent results table is a dynamic results table and the record does not exist in the pertinent results table; and
storing the access information in the record of the pertinent results table.

14. A computer-implemented method for analyzing traffic data in a distributed computing environment, the method comprising:
storing a plurality of traffic data hits in a storage structure associated with a hardware server;
initializing one or more static results tables;
parsing the traffic data hits from the storage structure associated with the hardware server to extract access information;
storing the access information in one of the static results tables or one of a plurality of dynamic results tables, wherein storing the access information comprises:
selecting a pertinent results table, the pertinent results table being one of the static results tables or one of the dynamic results tables;
identifying a type of the access information;
identifying a record corresponding to the type of the access information;
creating the record in the pertinent results table if the pertinent results table is a dynamic results table and the record does not exist in the pertinent results table; and
storing the access information in the record of the pertinent results table;
summarizing the access information into analysis results; and
storing the analysis results in a container file.

15. The computer-implemented method of claim 14, wherein storing the plurality of traffic data hits comprises storing the traffic data hits in a log file associated with the storage structure, each traffic data hit is stored in a log file format, and the log file format comprises a plurality of fields.

16. The computer-implemented method of claim 15 wherein the access information includes the contents of the fields of the log file format.

17. The computer-implemented method of claim 14, wherein the access information includes contextual information derived from the traffic data hit.

18. The computer-implemented method of claim 14, further comprising defining a time slice and wherein storing the analysis results in the container file is performed when the time slice is ended.

* * * * *

UNITED STATES PATENT AND TRADEMARK OFFICE
CERTIFICATE OF CORRECTION

PATENT NO.           : 7,734,772 B2
APPLICATION NO.    : 11/682150
DATED                : June 8, 2010
INVENTOR(S)        : William Glen Boyd and Elijahu Shapira Page 1 of 2

It is certified that error appears in the above-identified patent and that said Letters Patent is hereby corrected as shown below:

In the drawings, insert on Sheet 3 of 12 above label FIG. 3B, the following which comprises FIG. 3B:
See attached TARPON.GULF.NET – [12/JAN/1996:20:38:17 +0000]
"GET/GENERAL.HTM HTTP/1.0" 200 3599

Column 2, line 12, "Intersè" should read --Intersé--;
Column 3, line 62, "server 11" should read --server 10--;
Column 6, line 23, "tarpon.gulfnet" should read --"tarpon.gulf.net"--;
Colum 9, line 14, "arc" should read --are--;
Column 10, line 19, "(block 12)" should read --(block 121)--;
Column 11, line 36, "arc" should read --are--;
Column 11, line 55, "arc" should read --are--.

Signed and Sealed this
Thirtieth Day of October, 2012

David J. Kappos
*Director of the United States Patent and Trademark Office*